(12) United States Patent
Stepanova

(10) Patent No.: US 11,055,084 B2
(45) Date of Patent: Jul. 6, 2021

(54) INTERACTING WITH PRODUCT FEATURES USING SUPPORT METHODS

(71) Applicant: Dropbox, Inc., San Francisco, CA (US)

(72) Inventor: Olga Stepanova, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 23 days.

(21) Appl. No.: 16/698,696

(22) Filed: Nov. 27, 2019

(65) Prior Publication Data

US 2021/0157564 A1 May 27, 2021

(51) Int. Cl.
| | |
|---|---|
| *G06F 9/44* | (2018.01) |
| *G06F 8/65* | (2018.01) |
| *G06F 9/54* | (2006.01) |
| *G06F 3/0482* | (2013.01) |
| *G06F 16/953* | (2019.01) |
| *G06F 9/451* | (2018.01) |

(52) U.S. Cl.
CPC .............. *G06F 8/65* (2013.01); *G06F 3/0482* (2013.01); *G06F 9/451* (2018.02); *G06F 9/54* (2013.01); *G06F 16/953* (2019.01)

(58) Field of Classification Search
CPC .......... G06F 8/65; G06F 9/451; G06F 16/953; G06F 3/0482; G06F 9/54
USPC .................................................. 717/120–122
See application file for complete search history.

(56) References Cited

U.S. PATENT DOCUMENTS

| | | | |
|---|---|---|---|
| 2015/0365491 A1 | 12/2015 | Chan et al. | |
| 2016/0344604 A1* | 11/2016 | Raleigh | .................... G06F 9/54 |
| 2017/0142040 A1 | 5/2017 | Kansky | |
| 2019/0004793 A1 | 1/2019 | Brebner | |

* cited by examiner

*Primary Examiner* — Chuck O Kendall
(74) *Attorney, Agent, or Firm* — Hickman Becker Bingham Ledesma LLP; Adam C. Stone

(57) ABSTRACT

Techniques for interacting with a product feature of a content management system using a support application are described. In some embodiments, a method comprises: obtaining a service definition identifying a set of API support methods implemented by a network service that supports a particular product feature of a content management system, wherein each API support method of the set of API support methods, when invoked, causes a respective interaction with the particular product feature; generating a graphical user interface for supporting the particular product feature based on the set of API support methods; based on detecting user interaction with particular graphical user interface controls of the graphical user interface, invoking a corresponding support method of the set of API support methods thereby causing the respective interaction with the particular product feature; receiving particular output of the particular support method from the network service; and displaying a representation of the particular output in a graphical user interface.

20 Claims, 8 Drawing Sheets

FIG. 6C

GRAPHICAL USER INTERFACE 600

USER INFORMATION PANEL 610

Name: John Doe
User ID: John1234
Account Type: Group
Plan Name: Business 101
Plan Description: Business Membership Plan
Group Membership:
Group Name: Company ABC
Is Admin: No
State: Active

FEATURE SELECTION PANEL 620

FEATURE BUTTON 622 — Smart Synchronization

FEATURE BUTTON 624 — Folder Structure Migration

FEATURE BUTTON 626 — Team-Based Subscription

FEATURE BUTTON 628 — Enterprise Security

INTERACTING WITH PRODUCT FEATURES USING SUPPORT METHODS

TECHNICAL FIELD

The present disclosure relates to content management systems and, more specifically, to interacting with product features using support methods.

BACKGROUND

End-users of content management systems use such systems to interact (e.g., create, edit, view, share, comment on, etc.) with many electronic documents and other information such as, for example, electronic communications, messages, images, data, etc. For example, employees of a company may interact with hundreds or thousands of content items via a content management system.

A customer experience team supporting a content management system may use a customer support application to troubleshoot user inquiries, such as requests or issues related to product features used by end-users of the content management system. When a new product feature is developed, the support application may need to be modified to include functionality for supporting the new feature. Similarly, if a product feature is modified or updated, the support application may also need to be updated accordingly to support the modified or updated product feature.

However, building a graphical user interface for the support application that inter-operates with a new, modified, or updated product feature may require extensive coordination of technical and business stakeholders. Product engineers may not be able to simply "add a button" to the support application for each new product feature. Product engineers that develop product features may not be familiar with customer support workflows or with the customer support application. The product engineers might not have the knowledge about how customer experience agents desire to interact with product features for support purposes, how the interactions fit into the overall support workflow, and how to develop tools for the support application. As a result of all this, customer support applications may not provide adequate graphical user interface functionality for supporting product features of a content management system.

Similarly, a team of support engineers that develops the support application may not have a deep technical understanding of the product features supported. Expertise with a way a product feature is implemented might be limited to the product engineers building that product feature or the expertise might otherwise be unavailable to the support engineers. A content management system may provide hundreds or thousands of product features that need to be supported by customer support engineers. Thus, it may be inefficient, or infeasible, to train support application engineers on each and every product feature, including each and every modification and update thereto.

Disclosed embodiments address these and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well-understand, routine, or conventional, merely by virtue of their inclusion in this section.

BRIEF DESCRIPTION OF THE DRAWINGS

In the drawings:

FIGS. 6A-6C illustrate example graphical user interfaces of a support application, according to an embodiment.

DETAILED DESCRIPTION

Figure 1:
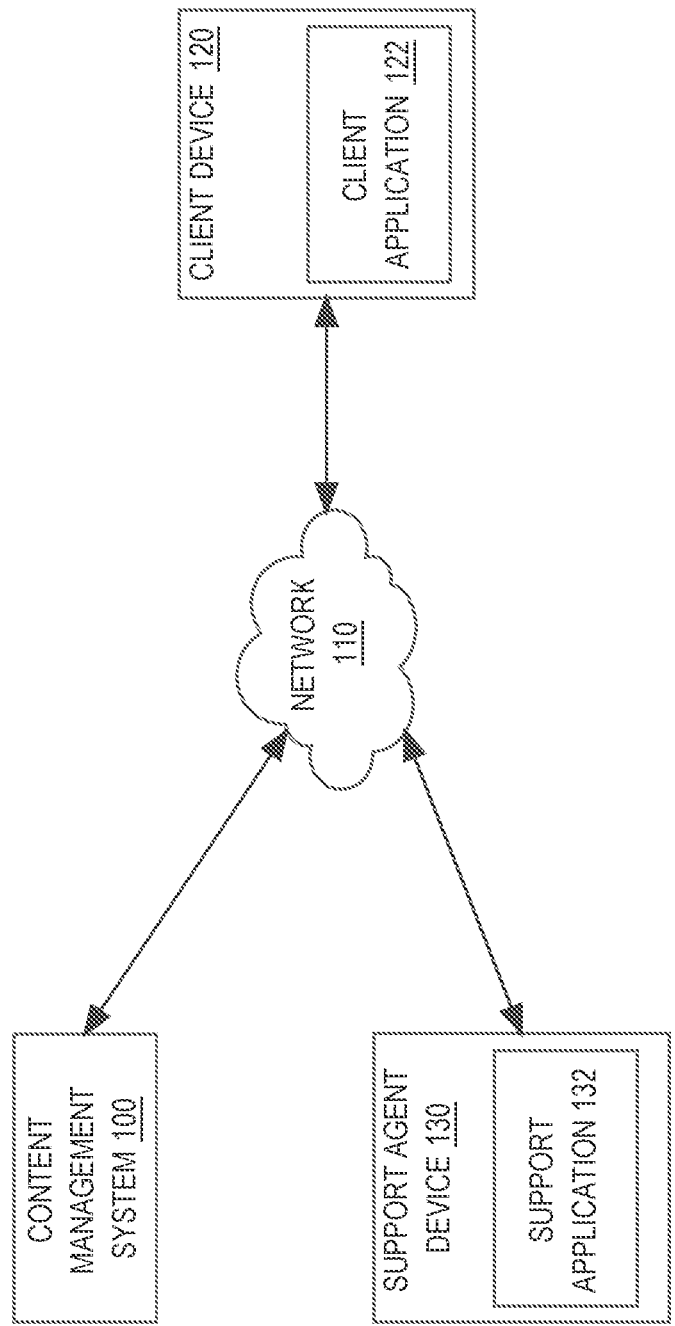
FIG. 1 illustrates a system environment including a content management system, support agent device, and client devices, according to an embodiment.

In the following description, for the purposes of explanation, numerous specific details are set forth in order to provide a thorough understanding of disclosed embodiments. It will be apparent, however, that disclosed embodiments may be practiced without these specific details. In other instances, some structures and devices are shown in block diagram form in order to avoid unnecessarily obscuring disclosed embodiments.

1. General Overview

The present disclosure is directed to a system and method for interacting with product features of a content management system using support methods.

As referred to herein, a product feature refers to a product functionality that enables a user to achieve a specific goal. For example, product features of the content management system may include product features relating to content synchronization, content storage, content versioning, user access, team access, content sharing, content collaboration, user account settings, user team settings, subscription and/or payments, account security, content security, connected applications, etc.

Each product feature may comprise one or more product elements. A product element may be a distinct element or capability enabling a micro-task within the larger goal the feature helps a user to achieve. For example, for a product feature relating to content synchronization, a product element may be a folder selection window.

Additionally, each product feature or element may include one or more attributes. An attribute is a facet of a product feature or a feature element. The attribute may be explicitly labeled in the product. For example, attributes for a subscription product feature may include subscription payment date, renewal date, subscription length, payment amount, etc. As another example, attributes for a product feature involving a storage structure change may include a current file or folder structure type, files or folders that use the current structure type, whether a storage structure change is pending, whether a change has been scheduled, a user or group administrator that requested the change, etc.

In some embodiments, the content management system may implement, for each product feature, a set of one or more auxiliary API support methods (or "API calls") which can be called by a support application in order to interact with the product feature, product elements, product feature attributes, and/or product element attributes. The set of methods for a product feature may include, for example, all of the following methods, a subset of these methods, or a superset of a subset of these methods: availability check, current status check, historical status check, immediate change of the current state, scheduling of the future state change, and adjustment of the historical state. The support application may invoke methods from the set of methods by sending API calls to the content management system to access and manipulate data related to the product feature, element(s) of the product feature, and/or attribute(s) of the product feature.

Additionally, the support application may automatically query data models for product features to discover new supported product features. The support application may receive data indicating that a product feature offers auxiliary API support methods and/or data indicating the auxiliary API support methods for the product feature. For a product feature that offers auxiliary API support methods, the support application may automatically generate a user interface for invoking the auxiliary API support methods of the product feature via user interface controls. A customer experience agent may use the user interface to interact with a product feature.

Using the set of support methods for a product feature, the support application accesses and manipulates the data model for the product feature, as well as views information regarding past states associated with the product feature, such as data logs. The methods allow a customer experience agent to request and receive information about a product feature for a customer from the content management system without having specific access permissions for the requested information.

Additionally, using the sets of support methods for product features, the content management system and the support application are able to be easily extended to support new, modified, and/or updated product features, as well as existing (old) features that were not supported before but for which support methods have been recently added. The support application may automatically obtain new service definitions for newly supported product features, or an updated service definition for previously supported product features. Based on the service definition, the support application may generate a corresponding graphical user interface. Thus, the support application can be automatically updated to support new, modified, and/or updated product features in a manner that provides graphical user interface consistency across different product features.

2. System Overview

FIG. 1 shows an example system environment including content management system 100, support agent devices 130, and client devices 120. Content management system 100 provides functionality for sharing content items with one or more client devices 120 and synchronizing content items between content management system 100 and the one or more client devices 120.

The content stored by content management system 100 can include any type of content items, such as documents, collaborative content items, text files, audio files, image files, video files, webpages, executable files, binary files, placeholder files that reference other content items, etc. In some embodiments, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In some embodiments, content stored by content management system 100 includes content items created using third party applications, e.g., word processors, video and image editors, database management systems, spreadsheet applications, code editors, and so forth, which are independent of content management system 100.

Users may create accounts at content management system 100 and store content thereon by sending such content from client device 120 to content management system 100. The content provided by users and associated with user accounts may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 and support agent devices 130 may communicate with content management system 100 through network 110. The network may be any suitable communications network for data transmission. In some embodiments, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In some embodiments, the entities use custom and/or dedicated data communications technologies instead of, or in addition to, the ones described above.

2.1 Client Device

Client device 120 may be implemented by any type of computing device, such as workstations, personal computers, laptops, connected devices such as a mobile phone or tablet, multi-processor systems, and the like. Client device 120 generally includes devices and modules for communicating with content management system 100 and a user of client device 120.

Client device 120 may access content management system 100 in a variety of ways. Client device 120 may access the system through a native application or software module, such as content management system client application 122. The client application 122 may take various forms, such as a stand-alone application, an application plug-in, or a browser extension. Additionally, client device 120 may access content management system 300 through a web browser. Alternately, the client application 122 may integrate access to content management system 100 with the local file management system on client device 120. When access to content management system 100 is integrated in the local file management system, a file organization scheme maintained at content management system is represented as a local file structure in conjunction with the client application. The client application 122 may store a copy of content accessed from a content storage at content management system 100 in a local storage device of client device 120, and synchronize content modified by client device 120 with the content maintained by content management system 100.

2.2 Content Management System

Figure 2:
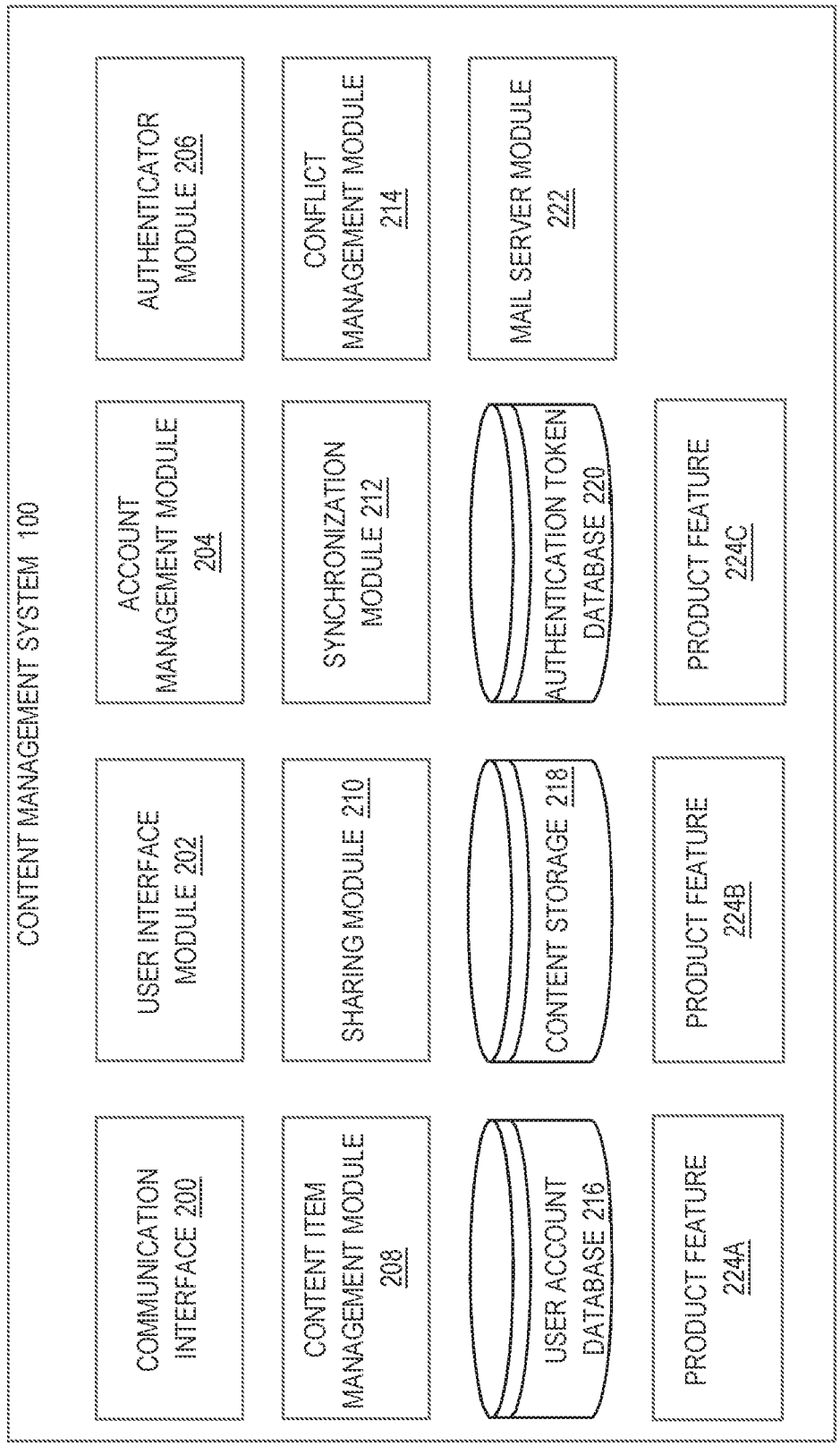
FIG. 2 illustrates a content management system, according to an embodiment.

FIG. 2 illustrates a block diagram of the content management system 100 according to some embodiments.

To facilitate various content management services, a user can create an account with content management system 100. The account information can be maintained in user account database 216, and is one means for performing this function. User account database 216 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as product features or other data being "associated" with a user are understood to mean an association between a product feature and either of the above forms of user identifier for the user. The same types of mechanisms can be used to associate users with comments, threads, text elements, formatting attributes, and the like.

User account database 216 can also include account management information, such as account type, e.g., free or paid; usage information for each user, e.g., file usage history; maximum storage space authorized; storage space used; content storage locations; security settings; personal configuration settings; content sharing data; etc. Account management module 204 can be configured to update and/or obtain user account details in user account database 216. Account management module 204 can be configured to interact with any number of other modules in content management system 100.

An account can be used to store content items from one or more client devices associated with the account. Content items can be shared with multiple users and/or user accounts. In some embodiments, sharing a content item can include associating, using sharing module 210, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some embodiments, shared content items can be accessible to a recipient user without requiring authentication into a user account. This can include sharing module 210 providing access to a content item through activation of a link associated with the content item or providing access through a globally accessible shared folder.

The content can be stored in content storage 218, which is one means for performing this function. Content storage 218 can be a storage device, multiple storage devices, or a server. Alternatively, content storage 218 can be a cloud storage provider or network storage accessible via one or more communications networks. In one configuration, content management system 300 stores the content items in the same organizational structure as they appear on the client device. However, content management system 100 can store the content items in its own order, arrangement, or hierarchy.

Content storage 218 can also store metadata describing content items, content item types, and the relationship of content items to various accounts, folders, or groups. The metadata for a content item can be stored as part of the content item or can be stored separately. In one configuration, each content item stored in content storage 218 can be assigned a system-wide unique identifier.

Content storage 218 can decrease the amount of storage space required by identifying duplicate files or duplicate segments of files. Instead of storing multiple copies of an identical content item, content storage 218 can store a single copy and then use a pointer or other mechanism to link the duplicates to the single copy. Similarly, content storage 218 stores files using a file version control mechanism that tracks changes to files, different versions of files (such as a diverging version tree), and a change history. The change history can include a set of changes that, when applied to the original file version, produces the changed file version.

Content management system 200 automatically synchronizes content from one or more client devices, using synchronization module 212, which is one means for performing this function. The synchronization is platform agnostic. That is, the content is synchronized across multiple client devices 120 of varying type, capabilities, operating systems, etc. For example, a client application may synchronize, via synchronization module 212 at content management system 100, content in client device 120's file system with the content in an associated user account on system 100. The client application may synchronize any changes to content in a designated folder and its sub-folders with the synchronization module 212. Such changes include new, deleted, modified, copied, or moved files or folders. Synchronization module 212 also provides any changes to content associated with client device 120 to the client application. This synchronizes the local content at client device 120 with the content items at content management system 100.

Conflict management module 214 determines whether there are any discrepancies between versions of a content item located at different client devices 120. For example, when a content item is modified at one client device and a second client device, differing versions of the content item may exist at each client device. Synchronization module 212 determines such versioning conflicts, for example by identifying the modification time of the content item modifications. Conflict management module 214 resolves the conflict between versions by any suitable means, such as by merging the versions, or by notifying the client device of the later-submitted version.

A user can also view or manipulate content via a web interface generated by user interface module 202. For example, the user can navigate in a web browser to a web address provided by content management system 100. Changes or updates to content in content storage 218 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 200 for interfacing with various client devices 120, and with other content and/or service providers via an Application Programming Interface (API), which is one means for performing this function. Certain software applications access content storage 218 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 218 through a web site.

Content management system 100 can also include authenticator module 206, which verifies user credentials, security tokens, API calls, specific client devices, etc., to determine whether access to requested content items is authorized, and is one means for performing this function. Authenticator module 206 can generate one-time use authentication tokens for a user account. Authenticator module 206 assigns an expiration period or date to each authentication token. In addition to sending the authentication tokens to requesting client devices, authenticator module 206 can store generated authentication tokens in authentication token database 220. After receiving a request to validate an authentication token, authenticator module 206 checks authentication token database 220 for a matching authentication token assigned to the user. Once the authenticator module 206 identifies a matching authentication token, authenticator module 206 determines if the matching authentication token is still valid. For example, authenticator module 206 verifies that the authentication token has not expired or was not marked as used or invalid. After validating an authentication token, authenticator module 206 may invalidate the matching authentication token, such as a single-use token. For example, authenticator module 206 can mark the matching authentication token as used or invalid, or delete the matching authentication token from authentication token database 220.

In some embodiments, content management system 100 includes a content management module 208 for maintaining a content directory that identifies the location of each content item in content storage 218, and allows client applications to request access to content items in the storage 218, and which is one means for performing this function. A content entry in the content directory can also include a content pointer that identifies the location of the content item in content storage 218. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

Content management system 100 may provide a plurality of product features, such as product features 224A, 224B, and 224C (collectively, product features 224). The product features 224 may each belong to, interact with, or utilize one or more of the elements of content management system 100 described above. Each product feature 224 may include a respective set of API methods for interacting with the product feature. The respective set of API methods may be implemented by a respective network service for the product feature. A network service is an application that provides data storage, manipulation, presentation, communication or other capability. In some embodiments, the network service may be, or may be part of, one or more of the elements of content management system 100 described above. Alternately, a network service may provide auxiliary API support methods for a plurality of product features. The network service for each product feature 224 may receive API requests from a support application 132, interact with the corresponding product feature 224, and provide output data generated in response to the API requests to the support application 132.

Content management system 100 may store a service definition for each product feature. A service definition identifies the set of API methods for interacting with the product feature. The service definition may, for example, indicate the names of each support method and the parameters, if any, accepted by each support method. Content management system 100 may send the service definition(s) to a support application in response to a request for service definitions. Additionally or alternately, content management system 100 may send a service definition to the support application when a service definition is modified or when a new service definition is added.

Additionally, content management system 100 may store user account data associated with each product feature 224. The data may include, for example, such as product feature availability, product feature status, and attribute values for each user account or a group of user accounts. In an embodiment, content management system 100 stores a respective data model for each product feature. The data model for a product feature may be stored separately from the user account data described above. Additionally or alternately, the data model, or portions thereof, may be stored in the user account database 216 and/or the content storage 218. For example, the data model for a product feature relating to a user account may be stored in user account database 216, while the data model for a product feature relating to content storage may be stored in content storage 218.

In an embodiment, the data model for a product feature comprises data associated with the product feature, product feature elements, and/or attributes. For example, the data model may include availability information, current status information, and historical status information for the product feature, elements of the product feature, and/or attributes of the product feature or product feature elements.

In an embodiment, the availability information, current status information, and historical status information are associated with particular user accounts. Availability information for a particular user account may indicate whether a product feature or element is available and/or enabled for the particular user account. Current status information for the particular user account may indicate a current state of a product feature, product feature element or product feature attribute with respect to the particular user account. Historical status information for the particular user account may indicate historical state(s) of a product feature, product feature element, or product feature attribute with respect to the particular user account.

Additionally, the data model may include data describing the format and structure of the data associated with the product feature, product feature elements, and/or attributes.

2.3 Support Agent Device

Support agent device 130 may be implemented by any type of computing device, such as workstations, personal computers, laptops, connected devices such as a mobile phone or tablet, multi-processor systems, and the like. Support agent device 130 generally includes devices and modules for communicating with content management system 100 and a user of support agent device 130.

Support agent devices 130 may interact with content management system 100 in a variety of ways. Support agent device 130 may access the system through a native application or software module, such as a support application 132. The support application 132 may take various forms, such as a stand-alone application, an application plug-in, or a browser extension. Additionally or alternately, support agent device 130 may access support application 132 through a web browser.

Figure 3:
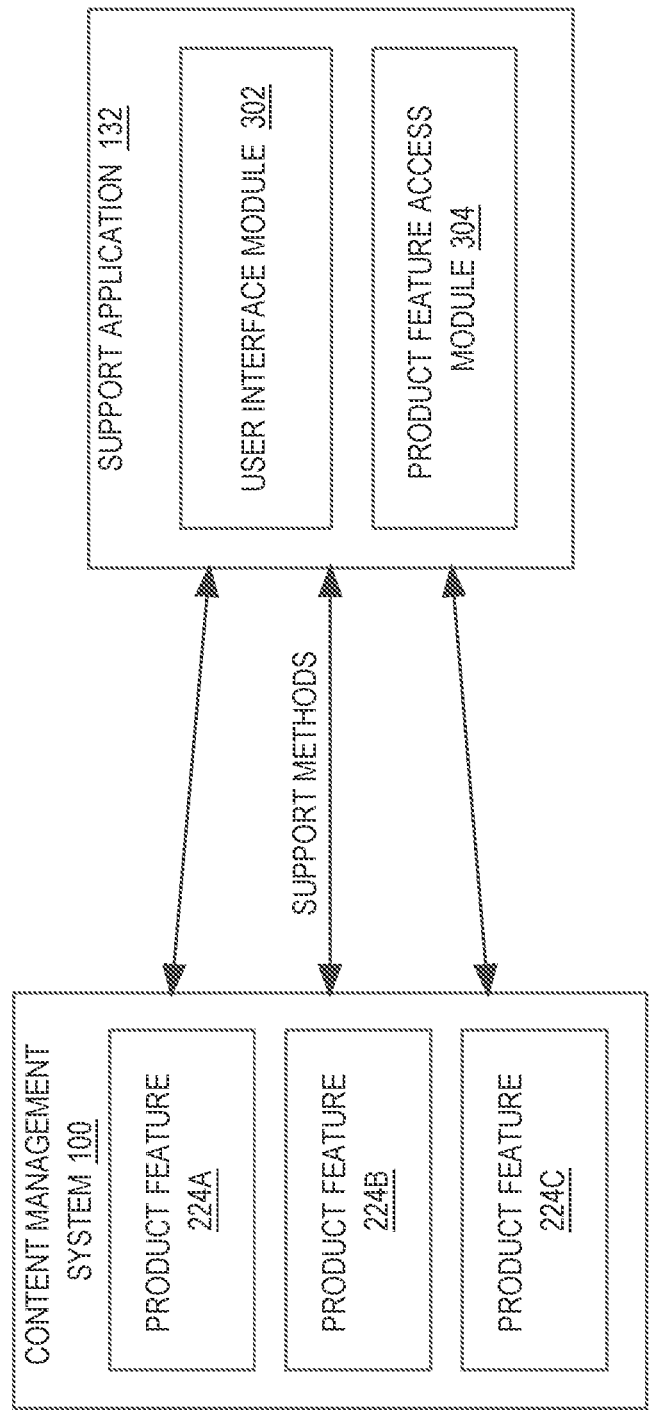
FIG. 3 illustrates a support application, according to an embodiment.

FIG. 3 illustrates a block diagram of support application 132 interacting with content management system 100.

Support agents may troubleshoot user requests using the support application 132. The support agent may use the support application, for example, to search for user accounts, view and update support request tickets, retrieve and display user account information, modify user account details, view user content item information, metadata and history, modify content item, user account, or account group access permissions. The support application 132 may communicate with content management system 100 to request or retrieve the user account and content item information, and to make changes to the user account.

Support application 132 includes user interface module 302 that generates an interface for providing user support and is one means for performing this function. The generated interface may display information related to the user account and the troubleshooting request, and may also include user interface elements for receiving input from a support agent relating to the user account. The generated interface may be provided to the support agent via a display of support agent device 130.

The support application 132 may not be able to natively request or retrieve information about a product feature as relates to a particular user or to make changes on behalf of the particular user. For example, product feature information may not be directly associated with a user account, e.g. not stored in the user account database, or the user account being supported may not have appropriate permissions to directly view the information or to make the requested changes, e.g., if such functionality is available only to select users, such as group administrators.

In some embodiments, support application 132 may include product feature access module 304, which can, among other things, manage access to product features of content management system 100. Product feature access module 304 may receive or retrieve service definitions for product features 224 from content management system 100. Each service definition identifies a set of methods for interacting with a respective product feature.

User interface module 302 may generate a graphical user interface corresponding to the set of methods for a product feature based on the service definition. The graphical user interface may include, for example, display elements for displaying information relating to product features, product feature elements, and/or attributes; user input elements for selecting a particular functionality or interaction provided by a support method, such as requesting status or availability information, making changes or updates to a product feature, product feature element, or attribute; and user input elements for receiving data relating to a functionality or interaction provided by the support method. For example, a user interface for changing the status of a product feature may include a selection or input element for providing an updated or modified status for the product feature.

Figure 6A:
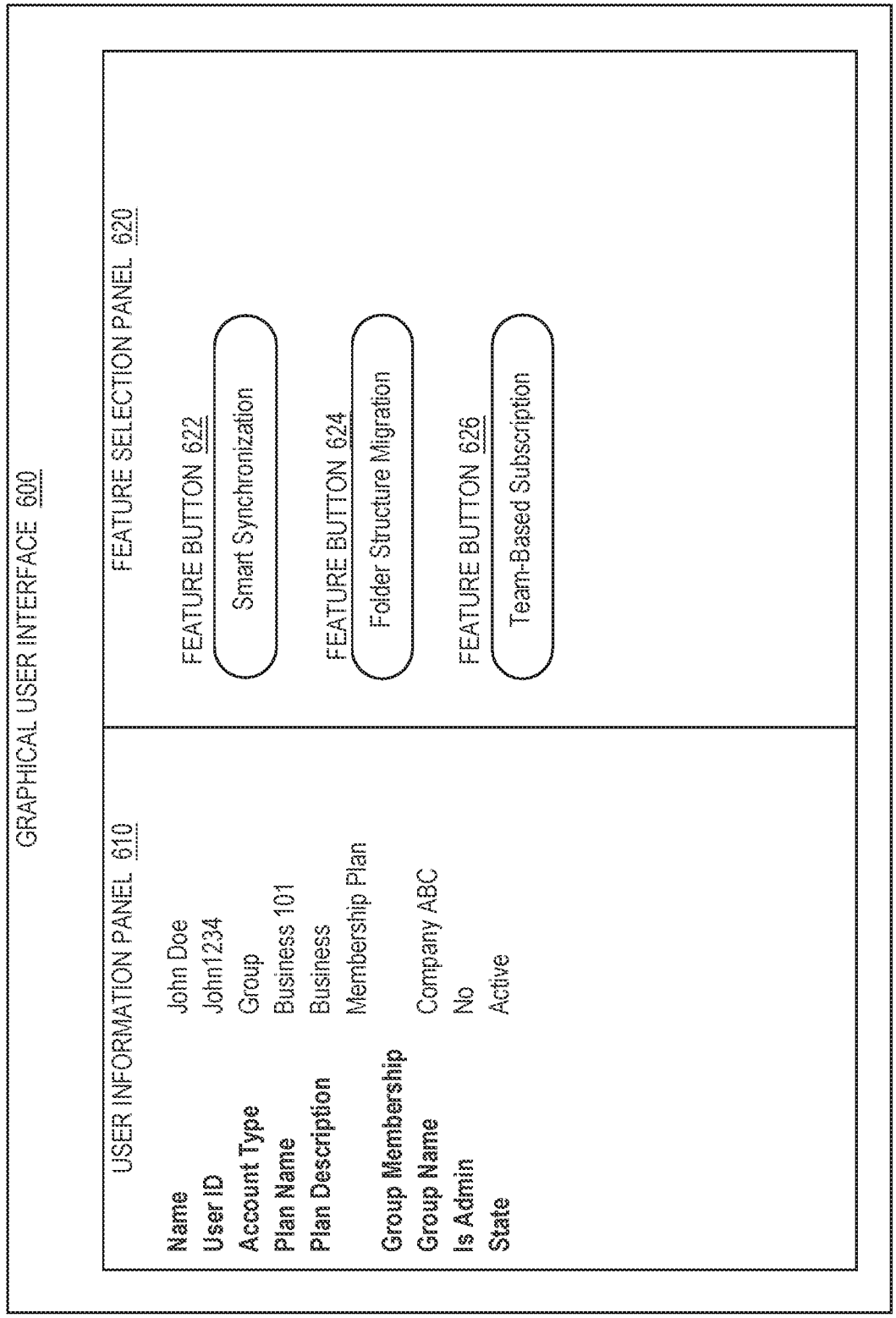
Figure 6B:
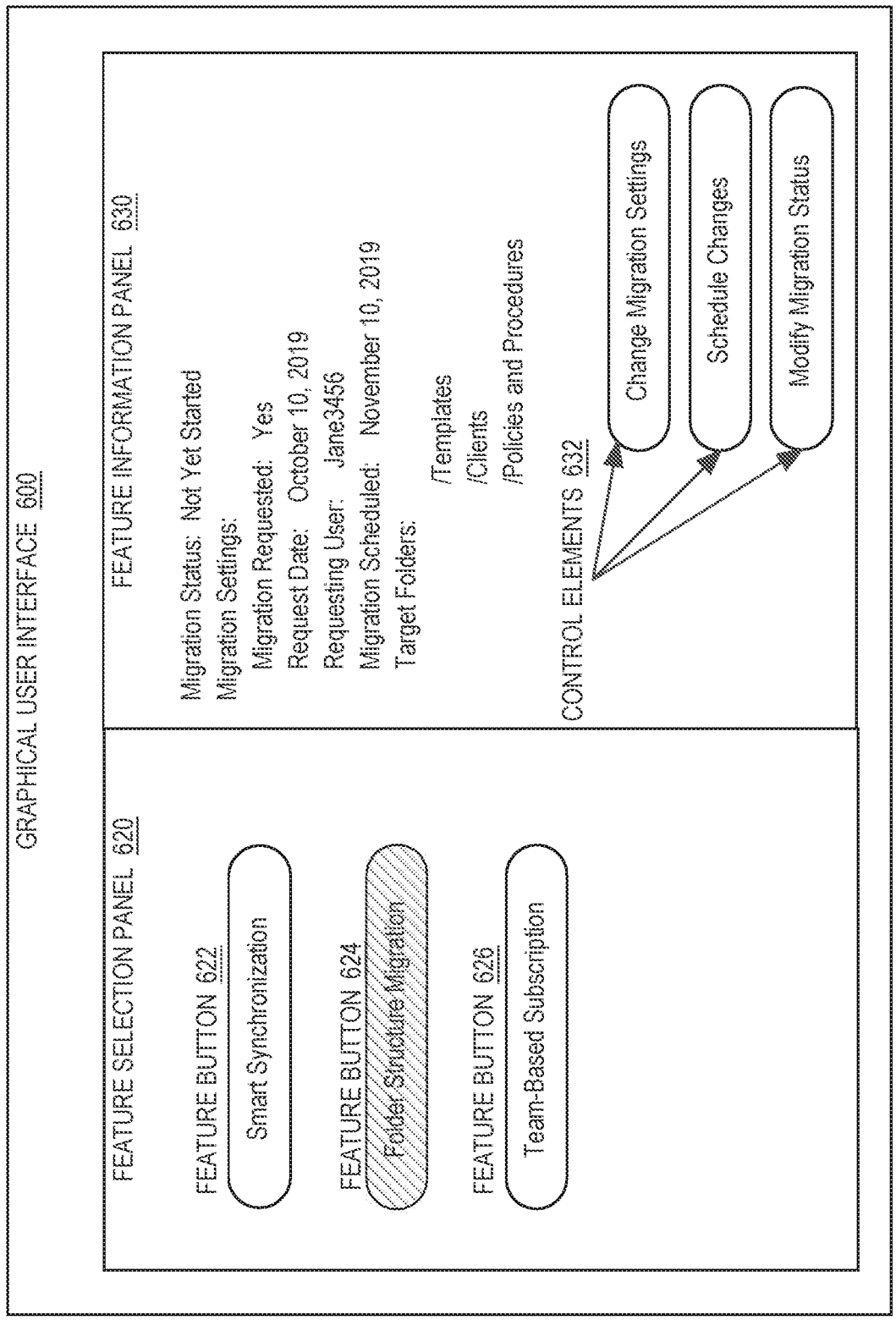

FIGS. 6A-C illustrate an example graphical user interface 600. In FIG. 6A, graphical user interface 600 comprises two panels, a user information panel 610 and feature selection panel 620. The user information panel 610 displays information for the user account associated with account identifier "John1234." The feature selection panel 620 includes feature buttons 622, 624, and 626. Each feature button may be associated with a particular product feature and, when selected, causes user interface module 302 to generate a graphical user interface corresponding to the selected product feature.

In FIG. 6A, feature button 622 is associated with a product feature "Smart Synchronization," feature button 624 is associated with a product feature "Folder Structure Migration," and feature button 626 is associated with a product feature "Team-Based Subscription."

Assume feature button 624 is selected. Feature button 624 is associated with a content storage product feature, "Folder Structure Migration." In response to a user selecting feature button 624, a graphical user interface may be generated that includes elements for viewing information related to "Folder Structure Migration" product feature and modifying information related to the product feature.

In FIG. 6B, a feature information panel 630 is generated in graphical user interface 600. The feature information panel 630 displays information about the "Folder Structure Migration" product feature. Additionally, the feature information panel 630 includes control elements 632. The control elements 632 include a "Change Migration Settings" button, a "Schedule Changes" button, and a "Modify Migration Status" button. Each button, when pressed, may generate further control elements for entering information associated with the selected action.

When a user input element is selected for interacting with a product feature is selected, additional user input elements may be generated for receiving additional input related to the interaction. The number and/or types of user input elements may vary depending on the product feature and the interaction.

As an example, in FIG. 6B, when the "Change Migration Settings" button is selected, a selectable list of migration settings, i.e. elements and/or attributes of the "Folder Structure Migration" product feature, may be displayed. Each migration setting may correspond to one of the migration settings for which information is displayed, e.g. migration requested, request date, requesting user, scheduled migration date, selected folders. Each migration setting, when selected by the user, may cause additional control elements to be generated for entering modified information for the migration setting. For example, selecting the "Migration Scheduled" migration setting may cause a date/time picker to be displayed, selecting the "Target Folders" migration setting may cause a selectable list of available folders to be displayed, etc.

In an embodiment, product feature access module may request or receive new or modified service definitions for product features. In response to receiving a service definition for a new product feature, the user interface module 302 may generate a graphical user interface for the new product feature, or modify an existing graphical user interface to include the new product feature. In FIG. 6C, feature selection panel 620 includes a new feature selection button, feature button 628, which is associated with a new product feature, "Enterprise Security." In response to a user selecting feature button 628, a feature information panel 630 may be generated corresponding to the "Enterprise Security" product feature.

In an embodiment, in response to a user interacting with a user interface element, product feature access module 304 may cause one or more associated methods to be invoked at the content management system 100. Product feature access module 304 may determine the one or more methods associated with the user interface element, and send an API request to the content management system 100.

Additionally, product feature access module 304 may receive output data from content management system 100 indicating a result of the API request. The output data may be displayed to the user via the graphical user interface. In an embodiment, the output data comprises a set of structured data. Displaying the output data may include formatting and parsing the output data.

If the output data includes an error message or indicates that particular interactions cannot be performed, the graphical user interface may be updated based on the output data. For example, an indication of the error may be displayed in the graphical user interface. As another example, if one or more interactions cannot be performed, then the corresponding user interface elements may be disabled.

3. Support Methods

A set of auxiliary API support methods are provided for interacting with a product feature of content management system 100. The set of auxiliary API support methods may be separate and distinct from methods that provide the product feature functionality to the content management system, and may be created, stored, and/or utilized separately from the product feature itself.

Methods of the set of auxiliary API methods may be programmed to access a product feature's data model for reading and/or updating parameters of the product feature. The methods may interact with the product feature, particular elements of the product feature, and/or attributes of the product feature or product feature elements. Additionally, the methods may return output indicating the results of the interaction.

In an embodiment, the set of auxiliary API support methods may include methods for checking product feature availability, checking product feature status, and modifying product feature status. More specifically, the methods may include, for example, an availability check method, a current status check, a historical status check method, an immediate change of the current state method, a scheduling of the future state change method, an adjustment of the historical state method, and other types of methods for determining or modifying present, past, or future states of product features, their attributes, or their elements.

In an embodiment, an availability check method determines whether a product feature or product feature element is available and/or enabled for a particular user account. The availability check method may receive an input parameter specifying a particular user account. Additionally or alternatively, the availability check method may receive an input parameter specifying a particular product feature, product feature element, and/or product feature version, such as a product SKU, or a value indicating an experimental or early access version. In an embodiment, when executed, the availability check method queries the product feature data model and returns output data indicating whether the associated product feature or product feature element is available to the particular user account. Additionally or alternatively, the availability check method may return output data indicating whether the associated product feature or product feature element is enabled for the particular user account. In some embodiments, the availability check method is the first method invoked for a given feature, and other methods (discussed below) are only invoked if the availability check method returns output data indicating that the associated product feature is available for the particular user account.

In an embodiment, a current status check method determines a current state of a product feature, product feature element, or product feature attribute. The current status check method may receive an input parameter specifying a particular user account. The current status check method may be associated with a particular product feature, product feature element, or product feature attribute. For example, each product feature, element, or attribute may correspond to a particular current status check method for checking its state. Additionally or alternatively, the current status check method may receive an input parameter specifying a particular product feature, product feature element, and/or product feature attribute to check. Thus, through the use of input parameters, the same status check method may be used to determine a current state of various product features, feature elements and feature attributes. In an embodiment, when executed, the current status check method queries the product feature data model and returns output data indicating a current status of the associated product feature, product feature element, or product feature attribute.

In an embodiment, a historical status check method determines one or more historical states of a product feature, product feature element, or product feature attribute. The historical status check method may receive an input parameter specifying a particular user account. The historical status check method may be associated with a particular product feature, product feature element, or product feature attribute. For example, each product feature, element, or attribute may correspond to a particular historical status check method for checking its historical state. Additionally or alternatively, the historical status check method may receive an input parameter specifying a particular product feature, product feature element, and/or product feature attribute to check. Thus, through the use of input parameters, the same historical status check method may be used to determine a current state of various product features, feature elements, and feature attributes. In an embodiment, when executed, the historical status check method queries the product feature data model and returns output data indicating historical statuses of the associated product feature, product feature element, or product feature attribute.

In an embodiment, an immediate status change method modifies the current state of a product feature, product feature element, or product feature attribute. The immediate status change method may receive an input parameter specifying a particular user account. The immediate status change method may be associated with a particular product feature, product feature element, or product feature attribute. For example, each product feature, element, or attribute may correspond to a particular immediate status change method for immediately modifying its state. The immediate status change method may also receive one or more input parameters specifying an updated product feature or element state, or an updated attribute value. Additionally or alternatively, the immediate status change method may receive an input parameter specifying a particular product feature, product feature element, and/or product feature attribute to update, and the updated state or value. Thus, through the use of input parameters, the same status check method may be used to modify the state of various product features, feature elements, and feature attributes. In an embodiment, when executed, the immediate status change method updates the product feature data model with the updated state or value for the associated product feature, product feature element, or product feature attribute, and returns output data indicating a result of the update, e.g. whether the update was successful, the previous value, and/or the updated value.

In an embodiment, a scheduled status change method schedules a future modification of the current state of a product feature, product feature element, or product feature attribute. The scheduled status change method may receive an input parameter specifying a particular user account. The scheduled status change method may be associated with a particular product feature, product feature element, or product feature attribute. For example, each product feature, element, or attribute may correspond to a particular scheduled status change method for scheduling a modification of its state and causing the modification to be made in accordance with a specified schedule. The scheduled status change method may also receive one or more input parameters specifying an updated product feature or element state, or an updated attribute value, and an input parameter specifying a target date/time for performing the modification. Additionally or alternatively, the scheduled status change method may receive an input parameter specifying a particular product feature, product feature element, and/or product feature attribute to update, the updated state or value, and the target date/time. Thus, through the use of input parameters, the same scheduled status change method may be used to schedule a status change of various product features, feature elements, and feature attributes. In an embodiment, when executed, the scheduled status change method schedules an update to the product feature data model with the updated state or value for the associated product feature, product feature element, or product feature attribute, and returns output data indicating a result of scheduling the update, e.g. whether the scheduling was successful, the scheduled date/time of the modification, the previous value, and/or the updated value.

In an embodiment, a historical status change method modifies a historical state of a product feature, product feature element, or product feature attribute. For example, the historical status change method may retroactively modify the state of the product feature, the product feature element, or the product feature attribute. The historical status change method may receive an input parameter specifying a particular user account. The historical status change method may be associated with a particular product feature, product feature element, or product feature attribute. For example, each product feature, element, or attribute may correspond to a particular method for modifying its state. The historical status change method may also receive one or more input parameters specifying an updated product feature or element state, or an updated attribute value, and an input parameter specifying a particular historical state to update, such as an identifier or timestamp associated with the particular historical state. Additionally or alternatively, the historical status change method may receive an input parameter specifying a particular product feature, product feature element, and/or product feature attribute to update, the updated state or value, and the particular historical state. Thus, through the use of input parameters, the same historical status change method may be used to update the historical status of various product features, feature elements, and feature attributes. In an embodiment, when executed, the historical status change method determines the particular historical state to modify, updates the product feature data model with the updated state or value for the particular historical state of the associated product feature, product feature element, or product feature attribute, and returns output data indicating a result of the update, e.g. whether the update was successful, the particular historical state that was modified, the previous value, and/or the updated value.

The set of support methods may include some or all of the methods discussed above. Additionally, the set of support methods may include methods for performing other interactions not specifically described herein.

In some embodiments, the set of auxiliary API support methods for the product feature may be implemented by a product feature development team as part of the product feature. The methods for different product features may be programmed or configured such that the method names, types, parameters, and expected output conform to a standardized format. The support application may be configured to invoke methods and process output data returned by the invoked methods that follow the standardized format. Thus, the support application is able to utilize auxiliary API support methods for any product feature that includes a set of corresponding support methods. For example, support application may be able to interact with product features that it has not been specifically programmed to interact with. The support application only needs to be programmed or configured to invoke the auxiliary API support methods, to receive any output provided by the auxiliary API support methods, and to display a representation of the output to the support agent.

4. Interacting with Content Management System Product Features

Figure 4:
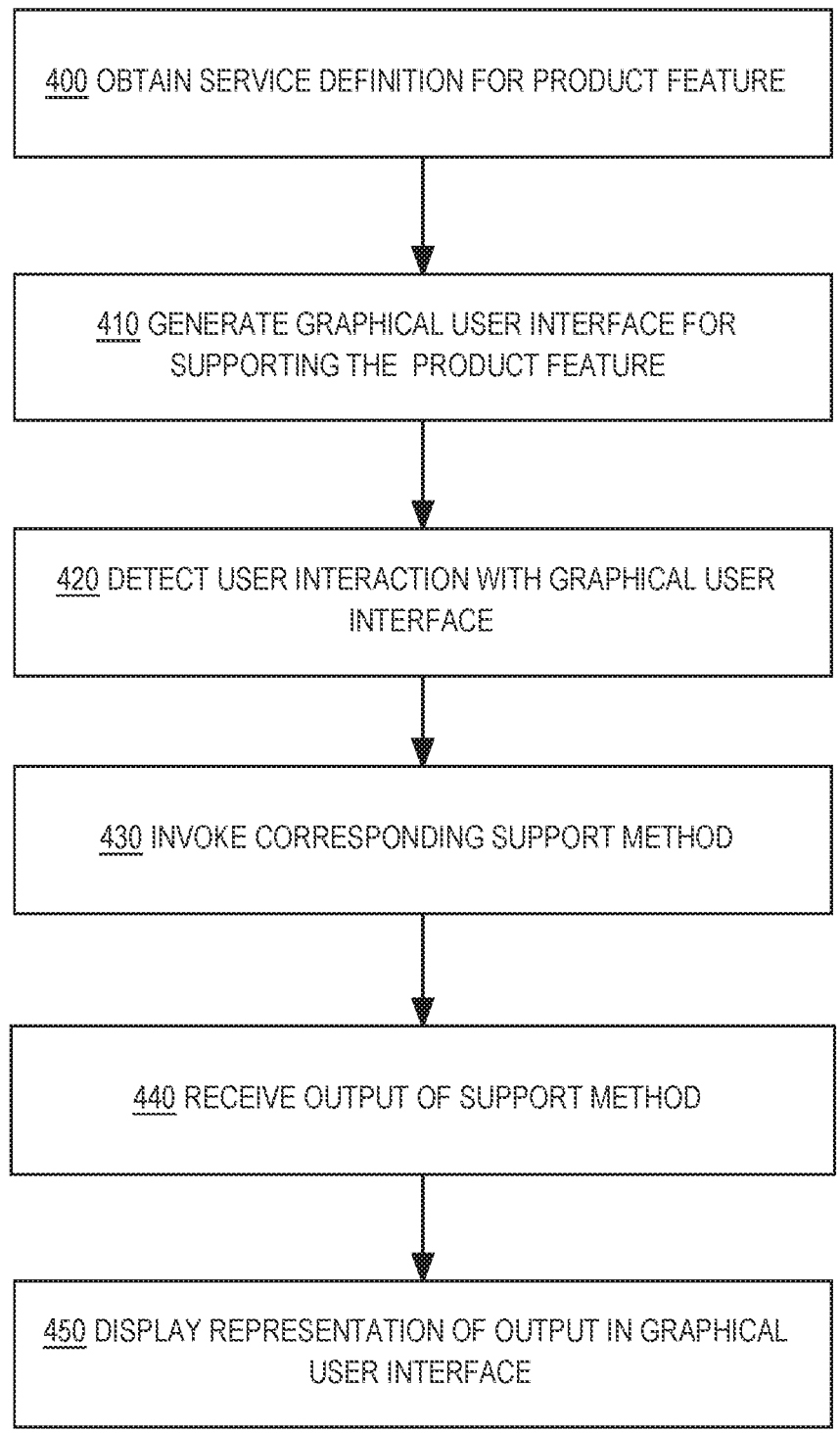
FIG. 4 illustrates an example process for interacting with a product feature using a support application.

FIG. 4 illustrates an example process for interacting with a product feature of a content management system using a support application.

Although the steps in FIG. 4 are shown in an order, the steps of FIG. 4 may be performed in any order, and are not limited to the order shown in FIG. 4. Additionally, some steps may be optional, may be performed multiple times, and/or may be performed by different components.

At step 400, the support application obtains a service definition for a product feature from the content management system. The service definition identifies a set of one or more auxiliary API support methods implemented by a network service that supports the product feature. Each support method of the set of support methods, when invoked, causes a respective interaction with the particular product feature.

In an embodiment, the support application obtains the service definition in response to sending a request for service definitions to the content management system. The support application may send the request, for example, when the application is first launched, prior to generating and displaying its graphical user interface. That is, the support application may query the content management system to obtain service definitions for available product features, and generate or modify its graphical user interface based on the available product features. For example, referring to FIG. 2, assume the support application receives a service definition for product features 224A, 224B, and 224C. The support application may generate a graphical user interface with user interface controls for selecting product feature 224A, product feature 224B, and product feature 224C. In response to detecting a selection of a particular product feature, the support application may generate a graphical user interface for supporting the particular product feature.

Additionally or alternately, the support application may periodically send a request to the content management system to obtain updated and/or new service definitions for product features. In some embodiments, the content management system may automatically provide new and/or updated service definitions to the support application when the service definitions are added or modified.

At step 410, the support application generates a graphical user interface for supporting the product feature based on the set of auxiliary API support methods identified in the service definition.

The graphical user interface may include, for example: display elements for displaying information relating to product features, product feature elements, and/or attributes, such as product feature name and description, product feature availability, current product feature status, and historical product feature status; user input elements for selecting a particular functionality or interaction provided by a support method, such as buttons for checking availability, checking statuses, and updating statuses; and user input elements for providing user input relating to a functionality or interaction provided by the support method, such as selecting a particular product feature element or attribute, selecting a date for a scheduled update, entering or selecting an updated status or attribute value, etc. Each support method may correspond to a respective set of one or more graphical user interface control elements.

At step 420, a user interaction with the graphical user interface is detected. A user interaction may be, for example, one or more of: pressing a button, selecting a menu item, selecting a tab, selecting an item from a list, checking a box, entering text into a field or textbox, adjusting a slider, interacting with a widget, etc. At step 430, in response to detecting a user interaction with a particular set of one or more graphical user interface controls, the support application invokes one or more support methods corresponding to the particular set of graphical user interface controls. Invoking the one or more support methods may comprise sending one or more API requests to the content management system. Each request may identify a support method and zero or more parameters of the support method. Invoking the support method causes the corresponding interaction with the product feature.

At step 440, output of the one or more support methods is received from the content management system. The output may comprise a set of structured data indicating a result of the interaction(s) with the product feature. For example, the output may indicate whether the product feature is available or enabled for a particular user account, a current status or historical status of the product feature or an element or attribute of the product feature, or the results of modifying the status of the product feature or an element or attribute of the product feature. If the interaction was not successful, then the output may comprise an error message.

At step 450, the support application displays a representation of the output in the graphical user interface. Displaying the representation of the output may comprise parsing the structured data, generating and/or formatting display message strings, and displaying the display message strings. If the output data includes an error message or indicates that particular interactions cannot be performed, the graphical user interface may be updated based on the output data. For example, an indication of the error may be displayed in the graphical user interface. As another example, if one or more interactions cannot be performed, then the corresponding user interface elements may be disabled.

The steps 420, 430, 440, and 450 described above may be repeated while a support agent continues to use and interact with the support application.

5. Example Computer System

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
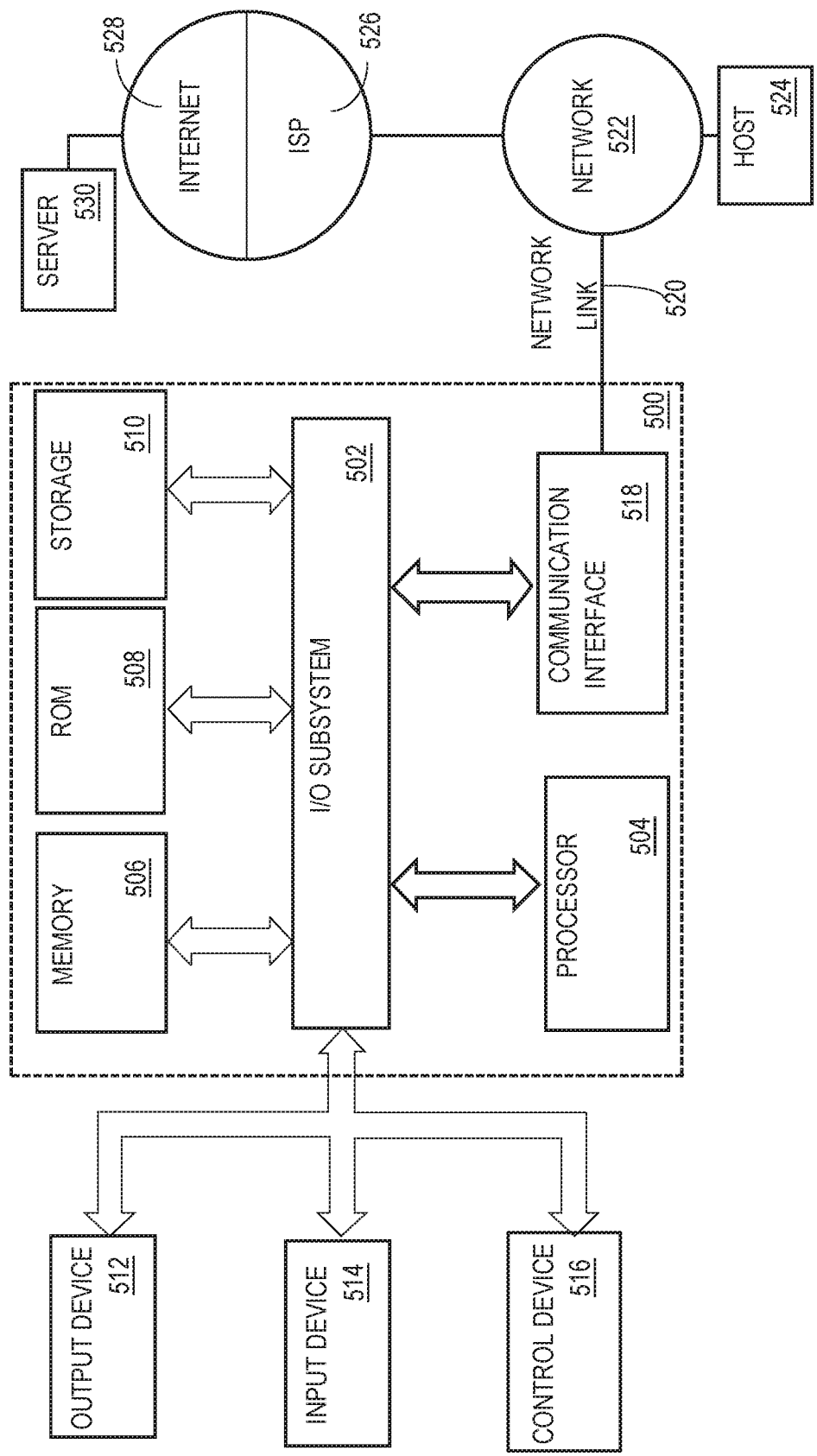
FIG. 5 illustrates an example of a basic hardware machine that may be utilized to implement disclosed embodiments.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more devices such as output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular radiotelephone data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method performed by one or more computer systems, the method comprising:
    obtaining, by a support application, a service definition identifying a set of one or more auxiliary application programming interface (API) support methods implemented, by a network service, for a product feature of a content management system, wherein each auxiliary API support method of the set of auxiliary API support methods, when invoked by the support application, causes a respective interaction with the product feature;
    based on the service definition, generating, by the support application, a graphical user interface for interacting with the product feature, the graphical user interface comprising one or more graphical user interface controls;
    wherein each graphical user interface control of the one or more graphical user interface controls is configured to invoke, upon detecting a user interaction with the graphical user interface control, at least one corresponding support method of the set of auxiliary API support methods;
    based on detecting a user interaction with at least one of the graphical user interface controls of the graphical user interface, invoking at least one support method of the set of auxiliary API support methods;
    wherein the respective interaction with the product feature caused by invoking the at least one corresponding support method comprises:
        checking an availability of the product feature,
        checking a current status of the product feature,
        checking a historical status of the product feature,
        modifying a current status of the product feature,
        scheduling a modification of a current status of the product feature, or
        modifying a historical status of the product feature,
    based on the invoking the at least one support method, receiving an output of the at least one support method from the network service;
    wherein the output of the at least one support method received from the network service comprises an indication of:
        whether the product feature is available,
        a current status of the product feature,
        a historical status of the product feature,
        a result of modifying a current status of the product feature,
        a result of scheduling a modification of a current status of the product feature, or
        a result of modifying a historical status of the product feature; and
    generating, by the support application, a representation of the output in the graphical user interface.

2. The method of claim 1 wherein:
    the respective interaction caused by the at least one support method checks an availability of the product feature;
    the output indicates whether the product feature is available.

3. The method of claim 1 wherein:
    the respective interaction caused by the at least one support method checks a current status of the product feature;
    the output indicates the current status of the product feature.

4. The method of claim 1 wherein:
    the respective interaction caused by the at least one support method checks a historical status of the product feature;
    the output indicates the historical status of the product feature.

5. The method of claim 1 wherein:
    the respective interaction caused by the at least one support method modifies a current status of the product feature;
    the output indicates a result of modifying the current status of the product feature.

6. The method of claim 1 wherein:
    the respective interaction caused by the at least one support method schedules a modification of a current status of the product feature;
    the output indicates a result of scheduling a modification of a current status of the product feature.

7. The method of claim 1 wherein:
    the respective interaction caused by the at least one support method modifies a historical status of the product feature;
    the output indicates a result of modifying the historical status of the product feature.

8. The method of claim 1 wherein obtaining the service definition comprises automatically querying, by the support application, the network service for one or more available service definitions, wherein each available service definition corresponds to a respective product feature.

9. The method of claim 8 wherein automatically querying the network service is performed periodically.

10. The method of claim 8 further comprising:
based on the one or more available service definitions, generating, by the support application, a graphical user interface for selecting product features;
wherein generating the graphical user interface for supporting the product feature is based on detecting user selection of graphical user interface controls corresponding to the product feature.

11. The method of claim 8, further comprising:
detecting, by the support application, a newly available service definition, wherein the newly available service definition identifies a set of one or more auxiliary API support methods implemented, by the network service, for a new product feature corresponding to the newly available service definition;
generating, by the support application, a second graphical user interface for supporting the new product feature corresponding to the newly available service definition based on the set of one or more auxiliary API support methods.

12. A system comprising:
one or more processors;
non-transitory computer-readable media storing instructions which are capable, when executed by the one or more processors, to cause the system to perform:
obtaining, by a support application, a service definition identifying a set of one or more auxiliary application programming interface (API) support methods implemented, by a network service, for a product feature of a content management system, wherein each auxiliary API support method of the set of auxiliary API support methods, when invoked, causes a respective interaction with the product feature;
based on the service definition, generating, by the support application, a graphical user interface for interacting with the product feature, the graphical user interface comprising one or more graphical user interface controls;
wherein each graphical user interface control of the one or more graphical user interface controls is configured to invoke, upon detecting a user interaction with the graphical user interface control, at least one corresponding support method of the set of auxiliary API support methods;
based on detecting a user interaction with at least one of the graphical user interface controls of the graphical user interface, invoking at least one support method of the set of auxiliary API support methods;
wherein the respective interaction includes one of:
checking an availability of the product feature,
checking a current status of the product feature,
checking a historical status of the product feature,
modifying a current status of the product feature,
scheduling a modification of a current status of the product feature, or
modifying a historical status of the product feature;
based on the invoking the at least one support method, receiving an output of the at least one support method from the network service;
wherein the output of the at least one support method received from the network service comprises an indication of:
whether the product feature is available,
a current status of the product feature,
a historical status of the product feature,
a result of modifying a current status of the product feature,
a result of scheduling a modification of a current status of the product feature, or
a result of modifying a historical status of the product feature; and
generating, by the support application, a representation of the output in the graphical user interface.

13. The system of claim 12 wherein obtaining the service definition comprises automatically querying the network service for one or more available service definitions, wherein each available service definition corresponds to a respective product feature.

14. The system of claim 13 wherein automatically querying the network service is performed periodically.

15. The system of claim 13 further comprising:
based on the one or more available service definitions, generating, by the support application, a graphical user interface for selecting product features;
wherein generating the graphical user interface for supporting the product feature is based on detecting user selection of graphical user interface controls corresponding to the product feature.

16. The system of claim 13, further comprising:
detecting, by the support application, a newly available service definition, wherein the newly available service definition identifies a set of one or more auxiliary API support methods implemented, by the network service, for a new product feature corresponding to the newly available service definition;
generating, by the support application, a second graphical user interface for supporting the new product feature corresponding to the newly available service definition based on the set of one or more auxiliary API support methods.

17. Non-transitory computer-readable media storing instructions which are capable, when executed by one or more processors, to cause the one or more processors to perform:
automatically querying, by a support application, a network service for one or more available service definitions, wherein each available service definition corresponds to a respective product feature of a content management system;
obtaining, by the support application, a particular service definition identifying a set of one or more auxiliary application programming interface (API) support methods implemented, by the network service, for a particular product feature of the content management system, wherein each auxiliary API support method of the set of auxiliary API support methods, when invoked, causes a respective interaction with the particular product feature;
based on the particular service definition, generating, by the support application, a graphical user interface for interacting with the particular product feature, the graphical user interface comprising one or more graphical user interface controls;
wherein each graphical user interface control of the one or more graphical user interface controls is configured to invoke, upon detecting a user interaction with the graphical user interface control, at least one corresponding support method of the set of auxiliary API support methods;
based on detecting user interaction with at least one of the graphical user interface controls of the graphical user interface, invoking at least one support method of the set of auxiliary API support methods;

wherein the respective interaction includes one of: checking an availability of the particular product feature, checking a current status of the particular product feature, checking a historical status of the particular product feature, modifying a current status of the particular product feature, scheduling a modification of a current status of the particular product feature, or modifying a historical status of the particular product feature;

based on the invoking the at least one support method, receiving an output of the at least one support method from the network service;

wherein the output of the at least one support method received from the network service comprises an indication of:
 whether the particular product feature is available,
 a current status of the particular product feature,
 a historical status of the particular product feature,
 a result of modifying a current status of the particular product feature,
 a result of scheduling a modification of a current status of the particular product feature, or
 a result of modifying a historical status of the particular product feature; and generating, by the support application, a representation of the output in the graphical user interface.

18. The non-transitory computer-readable media of claim 17 wherein automatically querying the network service is performed periodically.

19. The non-transitory computer-readable media of claim 17 further comprising:
 based on the one or more available service definitions, generating, by the support application, a graphical user interface for selecting product features;
 wherein generating the graphical user interface for supporting the particular product feature is based on detecting user selection of graphical user interface controls corresponding to the particular product feature.

20. The non-transitory computer-readable media of claim 17, further comprising:
 detecting, by the support application, a newly available service definition, wherein the newly available service definition identifies a set of one or more auxiliary API support methods implemented, by the network service, for a new product feature corresponding to the newly available service definition;
 generating, by the support application, a second graphical user interface for supporting the new product feature corresponding to the newly available service definition based on the set of one or more auxiliary API support methods.

* * * * *